J. R. Crabill's Automatic Car Brake.

116814

PATENTED JUL 11 1871

Witnesses:
Chas. Nida
Wm. H. C. Smith

Inventor:
J. R. Crabill
per Munn & Co.
Attorneys.

UNITED STATES PATENT OFFICE.

JOSEPH R. CRABILL, OF LA CROSSE, ILLINOIS.

IMPROVEMENT IN AUTOMATIC CAR-BRAKES.

Specification forming part of Letters Patent No. 116,814, dated July 11, 1871.

*To all whom it may concern:*

Be it known that I, JOSEPH R. CRABILL, of La Crosse, in the county of Hancock and State of Illinois, have invented a new and useful Improvement in Automatic Car-Brake; and I do hereby declare that the following is a full, clear, and exact description thereof, which will enable others skilled in the art to make and use the same, reference being had to the accompanying drawing forming part of this specification, in which—

Figure 1:
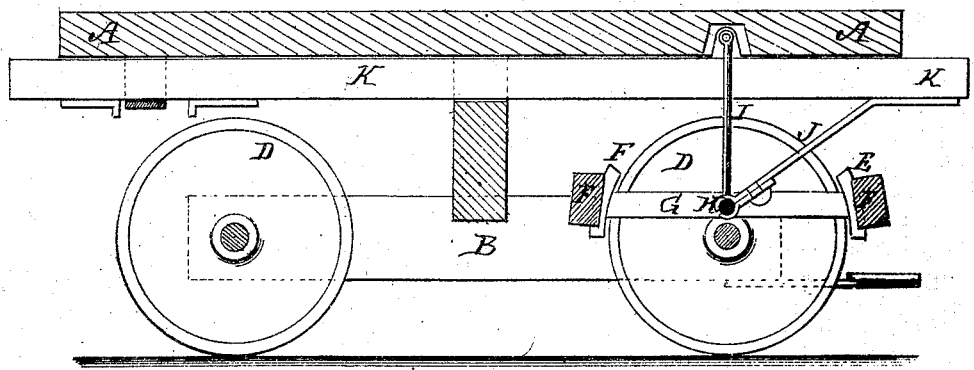
Figure 2:
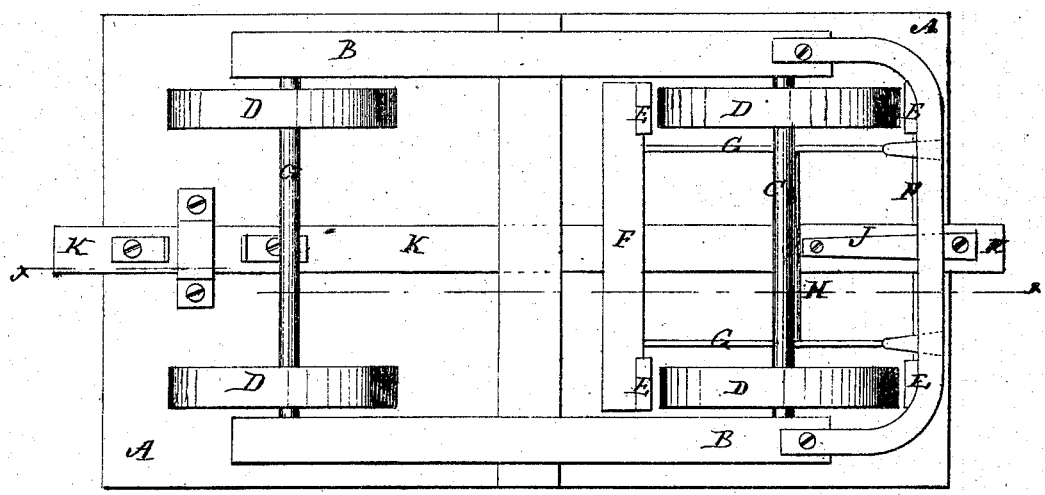

Figure 1 is a vertical longitudinal section of a railroad car, to which my improved brake has been attached, taken through the line $x\ x$, Fig. 2. Fig. 2 is an under-side view of the same.

Similar letters of reference indicate corresponding parts.

My invention has for its object to furnish an improved car-brake, which shall be simple in construction and effective in operation, being so constructed as to be applied by the running together of the cars as the engine is slowed, whatever end of the car may be forward; and it consists in the construction and combination of the various parts of the brake, as hereinafter more fully described.

A represents a car-body; B, the truck-frames; C, the axles; and D, the wheels of a car, about the construction of which parts there is nothing new. E are the brake-shoes, which are attached to the adjacent sides of the ends of two parallel bars F, which are placed upon the opposite sides of the wheels, and at a distance apart a little more than the diameter of the wheels. The parallel bars F are rigidly connected by bars G, as shown in Figs. 1 and 2. The bars G are connected at their central points by the rod H, which is pivoted to the lower ends of the rods I, the upper ends of which are pivoted to the car-body A directly over the car-axle C, so that when the frame F G H is allowed to swing freely the pivoting-points of the frame F G H and rods I will be in the vertical plane of the axle C. J is an arm in bearings, in the end of which the rod H works. The other or upper end of the arm J is rigidly attached to the bar K, which is placed beneath the body A of the car, slides longitudinally in keepers attached to said body, and the movement of which is limited by straps. The bar K is made of such a length that its ends project beyond the ends of the car so much that when the speed of the engine or a forward car is checked, causing the cars to run together, the forward end of the bar K may strike first and force the said bar back. This movement of the bar K moves the brake-frame F G H to the rearward, bringing the pivoting-points of the frame F G H to the rear of the axle C, and bringing the forward brake-shoes in contact with the tread of the wheels. This brings the center of the circle through an arc, of which the brake-shoes move in the rear of and above the axle or center of the circle through which the tread of the wheels move, causing the wheel to act as an eccentric with reference to the brake-shoes, thus causing the brake-shoes to hug the wheel with a constantly-increasing pressure.

By the peculiar arrangement of the tilting or pivoted frame the operation will be the same in whichever direction the car may be moving.

Having thus described my invention, I claim as new and desire to secure by Letters Patent—

1. The suspension of the brake from supports pivoted directly above the axle of the wheels to which the brake is to be applied, so that the movement of the said supports in either direction will apply the brake to the wheels, substantially as herein shown and described.

2. The pivoted brake-frame F G H, pivoting supports I, and arm J, in combination with the sliding bar K, car-body A, and wheels D, substantially as herein shown and described and for the purpose set forth.

JOSEPH R. CRABILL.

Witnesses:
R. BILLODICA,
WM. LOUDON.